US006820473B2

(12) United States Patent
Wagner et al.

(10) Patent No.: US 6,820,473 B2
(45) Date of Patent: Nov. 23, 2004

(54) METHOD AND DEVICE FOR THE CONTROL OF AN INTERNAL COMBUSTION ENGINE

(75) Inventors: Horst Wagner, Stuttgart (DE); Peter Schubert, Leingarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,667

(22) PCT Filed: Jul. 3, 2001

(86) PCT No.: PCT/DE01/02449

§ 371 (c)(1),
(2), (4) Date: Jul. 25, 2002

(87) PCT Pub. No.: WO02/12698

PCT Pub. Date: Feb. 14, 2002

(65) Prior Publication Data

US 2003/0037766 A1 Feb. 27, 2003

(30) Foreign Application Priority Data

Aug. 5, 2000 (DE) ........................................ 100 38 340

(51) Int. Cl.[7] .............................................. G01M 15/00
(52) U.S. Cl. ..................................................... 73/119 A
(58) Field of Search ............................ 73/118.1, 119 A, 73/116, 117.3, 119 R; 123/436, 406.42, 295, 305, 350

(56) References Cited

U.S. PATENT DOCUMENTS

| | | | | |
|---|---|---|---|---|
| 4,625,690 A | * 12/1986 | Morita | 123/399 |
| 4,901,699 A | * 2/1990 | Miwa et al. | 123/675 |
| 4,922,877 A | * 5/1990 | Nagaishi | 123/492 |
| 4,949,691 A | * 8/1990 | Abe et al. | 123/406.42 |
| 4,966,117 A | * 10/1990 | Kawamura | 123/406.42 |
| 5,016,591 A | * 5/1991 | Nanyoshi et al. | 123/406.45 |
| 5,047,943 A | * 9/1991 | Takahata et al. | 701/103 |
| 5,050,555 A | * 9/1991 | Mitsumoto | 123/406.42 |
| 5,485,374 A | 1/1996 | Takaku et al. | |
| 5,652,380 A | * 7/1997 | Machida | 73/116 |
| 5,996,547 A | 12/1999 | Machida et al. | |
| 6,173,570 B1 | * 1/2001 | Mitsumoto et al. | 60/286 |
| 6,694,945 B2 | * 2/2004 | Kawaguchi et al. | 123/436 |
| 2003/0233997 A1 | * 12/2003 | Kawaguchi et al. | 123/436 |

FOREIGN PATENT DOCUMENTS

| | | |
|---|---|---|
| DE | 40 33 049 | 4/1992 |
| DE | 198 44 746 | 4/2000 |
| DE | 100 23 911 | 3/2001 |

* cited by examiner

*Primary Examiner*—Edward Lefkowitz
*Assistant Examiner*—Maurice Stevens
(74) *Attorney, Agent, or Firm*—Kenyon & Kenyon

(57) ABSTRACT

A device and a method for controlling an engine. On the basis of a first variable which characterizes the injection quantity and a second variable which characterizes the angular position at which the injection quantity is metered, a third variable which characterizes the torque supplied by the engine is determined. Furthermore, on the basis of a fourth variable which characterizes the driver's intent, a fifth variable which characterizes the torque desired by the driver is determined. The third variable and the fifth variable are analyzed for the purpose of fault monitoring.

18 Claims, 3 Drawing Sheets

METHOD AND DEVICE FOR THE CONTROL OF AN INTERNAL COMBUSTION ENGINE

FIELD OF THE INVENTION

The present invention relates to a method and a device for controlling an engine.

BACKGROUND INFORMATION

A quantity controller and a method and a device for checking a sensor for detecting the position of a quantity controller are known from German Published Patent Application No. 40 33 049. With the method described there, a check is performed when the quantity controller is switched to currentless to determine whether a needle motion sensor or a corresponding sensor is delivering an output signal.

In addition, there are conventional methods in which various signals are subjected to a plausibility check with the other signals.

When using an injection quantity signal, the plausibility check with other signals may be problematical due to today's systems, there are often injections that do not make any contribution to engine torque. These include, for example, pre-injections before the actual injection and post-injections, which are used for exhaust gas treatment or for regeneration of filters and/or catalytic converters.

SUMMARY OF THE INVENTION

According to the present invention, on the basis of a first variable which characterizes the injection quantity and a second variable which characterizes the angle setting at which the injection quantity is metered, a third variable which characterizes the torque supplied by the engine may be determined. On the basis of a fourth variable which characterizes the driver's intent, a fifth variable which characterizes the torque desired by the driver may be determined. The third variable and the fifth variable may be analyzed for the purpose of fault monitoring. This method according to the present invention permits reliable and accurate fault detection, e.g., in the area of fuel metering and/or detection of the driver's intent. It may be advantageous here that the second variable which characterizes the angular position of the crankshaft or the camshaft during the injection may be taken into account. It may be possible to take into account the influence of the injected fuel on the torque supplied by the engine. The setpoint or the actual value of the start of injection, the start of delivery, the start of actuation or another corresponding variable may be used as the second variable.

It may be advantageous if the actuation duration of an output stage of a solenoid valve or a piezoactuator is used as the first variable. By using actuation signals for the output stage, it may be possible to test the functionality of the entire control unit.

It may be advantageous if the fourth variable corresponds to the position of an operating element. This also makes it possible to detect faults in the area of processing of the output signal of the operating element.

It may be advantageous if a fault is detected when the third variable and the fifth variable differ by more than a threshold value. Through this method, it may be possible to detect faults in the entire signal path of the control system. These include faults in the area of analysis of the input variables, calculation and determination of the output variables.

Due to the fact that the fault monitoring may occur only in certain operating states, this makes it possible to reduce complexity. Furthermore, a more accurate fault detection may be possible because fault detection is not performed in states in which no unambiguous results may be derived.

DETAILED DESCRIPTION

The method according to the present invention is described below on the example of the control system of a diesel engine. However, the method according to the present invention is not limited to the use with a diesel engine. It may also be used with other engines in which there is a correlation between the amount of fuel injected and the engine torque, and it may be used with systems in which there is a definite correlation between the amount of fuel injected and some other variable to be monitored.

Figure 1:
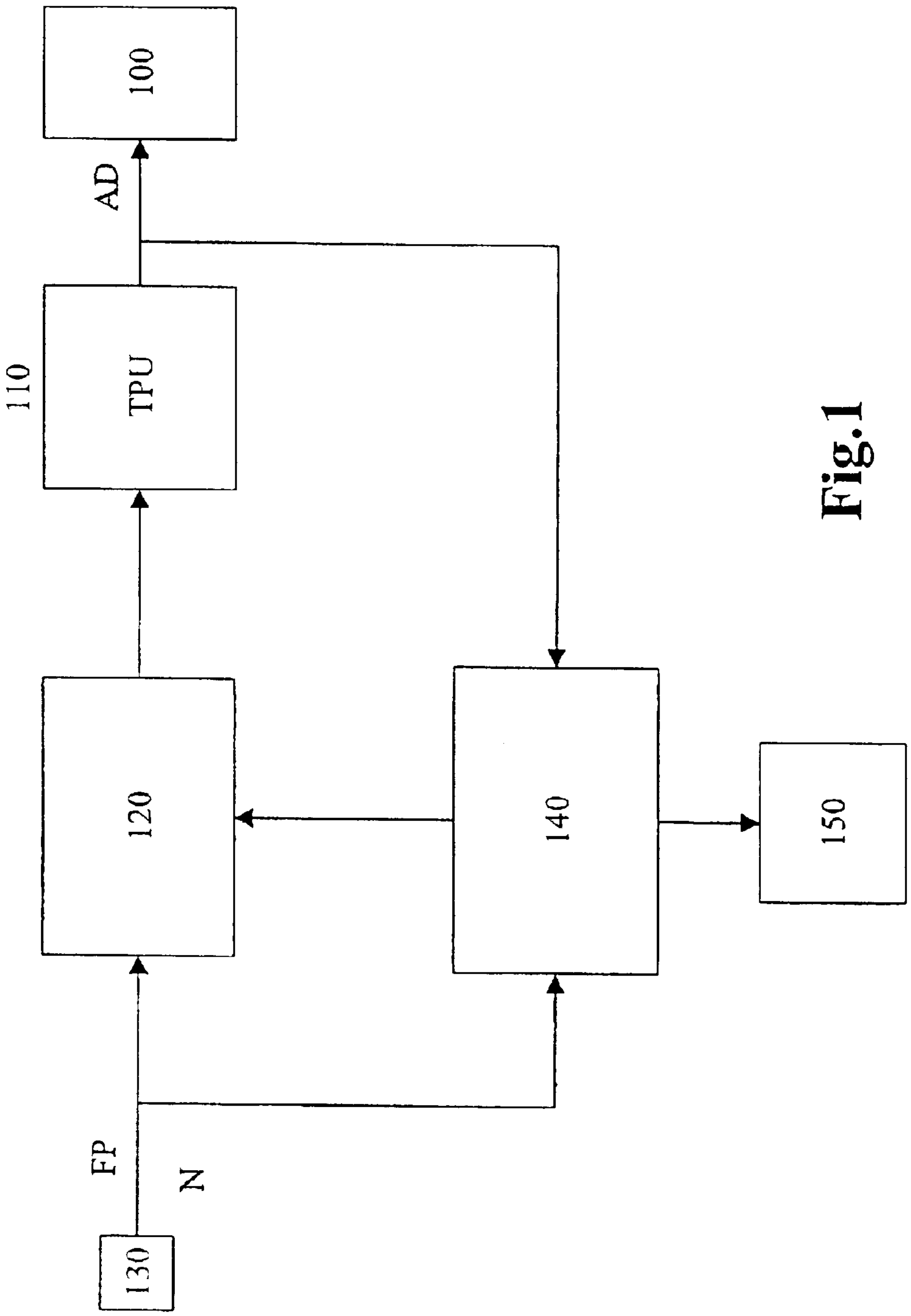
FIG. 1 shows a block diagram of the device according to the present invention.

FIG. 1 shows the elements of the device for controlling an engine. A final controlling element is labeled 100. This final controlling element 100 determines the amount of fuel to be injected into the engine. It may be a solenoid valve or a piezoactuator. The final controlling element of the engine allocates a certain amount of fuel, depending on the duration of a actuation signal.

Final controlling element 100 receives actuation signals from a unit 110 labeled TPU. The TPU here supplies signals which specify the start of injection and the end of injection. An output stage in the final controlling element converts these signals into actuation signals for actuating various switching arrangements.

Therefore, TPU 110 receives corresponding signals from a control system 120. Control system 120 processes sensor signals of various sensors 130 which supply signals, for example, with regard to driver's intent FP, speed N of the engine and other operating characteristics or environmental variables.

In addition, a watchdog 140 may be provided and it receives the output signals from various sensors as well as the output signals of the TPU. Watchdog 140 sends corresponding signals to control system 120 and, in an example embodiment, to a display 150. As an alternative, it may be possible for display 150 to be actuated by control system 120.

This device operates as follows. On the basis of various operating characteristics such as the engine speed and the driver's intent, control system 120 calculates the time at which injection is to occur and the amount of fuel to be injected. The amount of fuel to be injected may then be metered to the engine by final controlling element 100 and results in a corresponding torque.

In addition to the amount of fuel which is metered to generate torque, additional amounts of fuel are metered in each metering cycle or in individual cycles. Thus, for example, it may be possible for a pre-injection to occur before the actual fuel metering in order to reduce noise. In addition, there may also be a post-injection after the actual injection. The post-injection introduces hydrocarbons into the exhaust gas, among other things, which in turn causes an increase in temperature of the exhaust gas. In addition, these hydrocarbons may trigger reactions in a catalytic converter or particle filter downstream from the engine, where these reactions keep the catalytic converter and/or particle filter functional.

The post-injections, which are for an exhaust gas after-treatment system, do not contribute to the torque supplied by the engine. Other partial injections make only a reduced contribution to the torque.

Watchdog 140 processes the input signals of control system 120. Watchdog 140 enters the values of the accelerator pedal position sensor. This may be the output signal of an AD converter of accelerator pedal sensor 130. In addition, watchdog 140 analyzes the last detectable value, e.g., the actuation duration, and calculates whether these values may be plausible, independently of the normal quantity control. For example, if the accelerator pedal position assumes a large value and the actuation duration signal assumes a large value, this is recognized as a plausible value.

Such a method requires a method adapted to the injection system because watchdog 140 takes into account whether there has been, for example, a post-injection in the corresponding operating states. Consequently, watchdog 140 and the plausibility check may be adapted individually to the injection system.

According to the present invention, independently of the injection system, the data of each injection over 720 degrees of crankshaft angle of rotation may be made available over a defined interface. To do so, a variable corresponding to the amount injected and another variable corresponding to the angular position at which injection occurs are stored for each cylinder and each injection. With this information it may be possible to determine the torques formed in the cylinder and perform a plausibility check with other input variables.

Due to the fact that a uniform interface may be provided, the determination of the position and amount of fuel is adapted specifically to the injection system. Monitoring for plausibility may be performed in a similar manner for all systems. In addition, the data detected is intended for calculating the instantaneous engine power on the basis of the angular position of the crankshaft and the amount of fuel.

Figure 2:
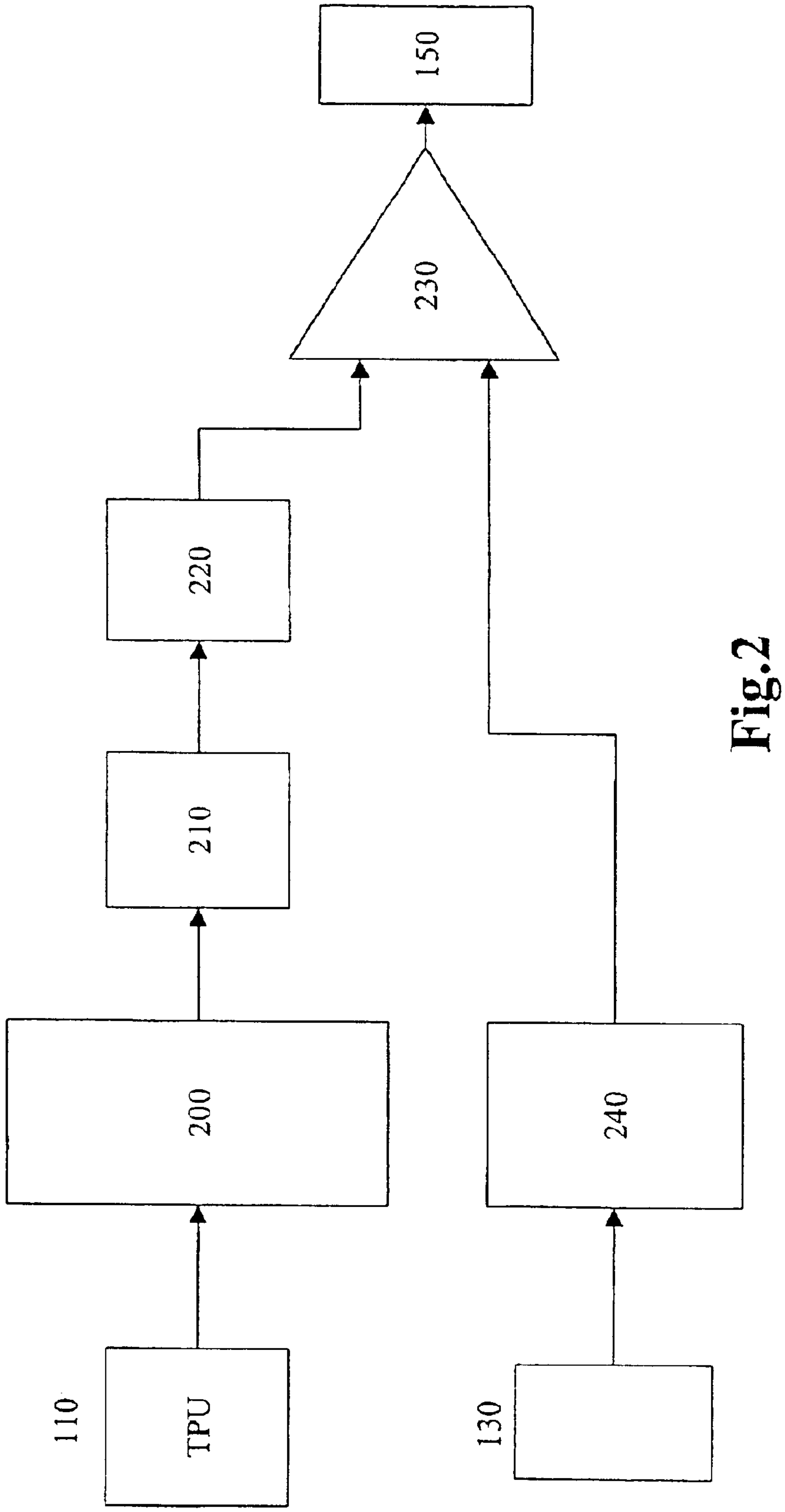
FIG. 2 shows a detailed diagram of the device according to the present invention.

This monitoring is illustrated in detail in FIG. 2. Elements already described in conjunction with FIG. 1 are labeled with the same reference numbers in FIG. 2. The output signal of TPU 110 goes to a table 200 and from there to a torque determination unit 210. The output signal of torque determination unit 210 goes via a torque summation unit 220 to a logic unit 230, which in turn supplies a corresponding output signal to display 150 or to control system 120. The output signal of a torque characteristics map 240 which receives output signals FP and N from sensors 130 as input variables is sent to the second input of logic unit 230.

This device functions as follows. The estimate of the indicated torque may be based on a variable which characterizes the injection quantity metered and a variable which characterizes the angular position at which the fuel quantity may be metered. The start of injection and the injection duration may be read out of the corresponding registers of TPU 110. Instead of the injection duration, the corresponding injection angle may also be used. The start of injection indicates the time or angular position of the crankshaft at which the injection occurs. The injection duration defines the duration of the injection and the angle traversed during the injection.

The actual starts of injection and injection durations or the times or angular positions at which the actuation of the final controlling element occurs may be read out of the TPU. A fuel quantity may be determined on the basis of the injection duration. The determination of the amount from the actuation duration takes into account, for example, the fact that the actuation of the final controlling element lasts longer than the actual injection. The amount of fuel determined for each injection may be entered into table 200 separately for each cylinder together with the start-of-actuation angle. This table contains all the injection events of a cylinder over 720 degrees of crankshaft angle. In addition, the cylinder number may also be stored in the table as an identification feature. To ensure data integrity, a counter may also be incremented each time the last event is entered into the table. For each cylinder, a message may be created with the table layout and may be managed by the operating system. This rules out the possibility of access conflicts due to simultaneous processing. In addition, it may be possible to adjust the memory demand to the number of cylinders required with no problem. The injection quantity and the respective start of injection may be determined in the table, preferably with synchronization of angles.

Table 200 forms the interface between the control system and the watchdog. The message including the table layout is the same for all injection systems.

In torque determination unit 210, an indicated torque may be calculated from this data for each cylinder and sent to torque summation unit 220. Torque summation unit 220 calculates indicated torques which may be added up for all cylinders with synchronization.

Then an indicated torque determined over a sampling period may be available at the output of torque summation unit 220.

In parallel with this, a variable which characterizes the driver's intent may be determined on the basis of accelerator pedal position FP and rotational speed N by using a torque characteristics map 240. This variable and the variable which characterizes the indicated torque may be checked for plausibility by logic unit 230 and checked for errors if deviations are found and a corresponding display 150 may be actuated.

Instead of torque characteristics map 240, a calculation may also be performed by using a formula. Furthermore, other variables or additional variables in addition to the accelerator pedal position and rotational speed may also be used.

Figure 3:
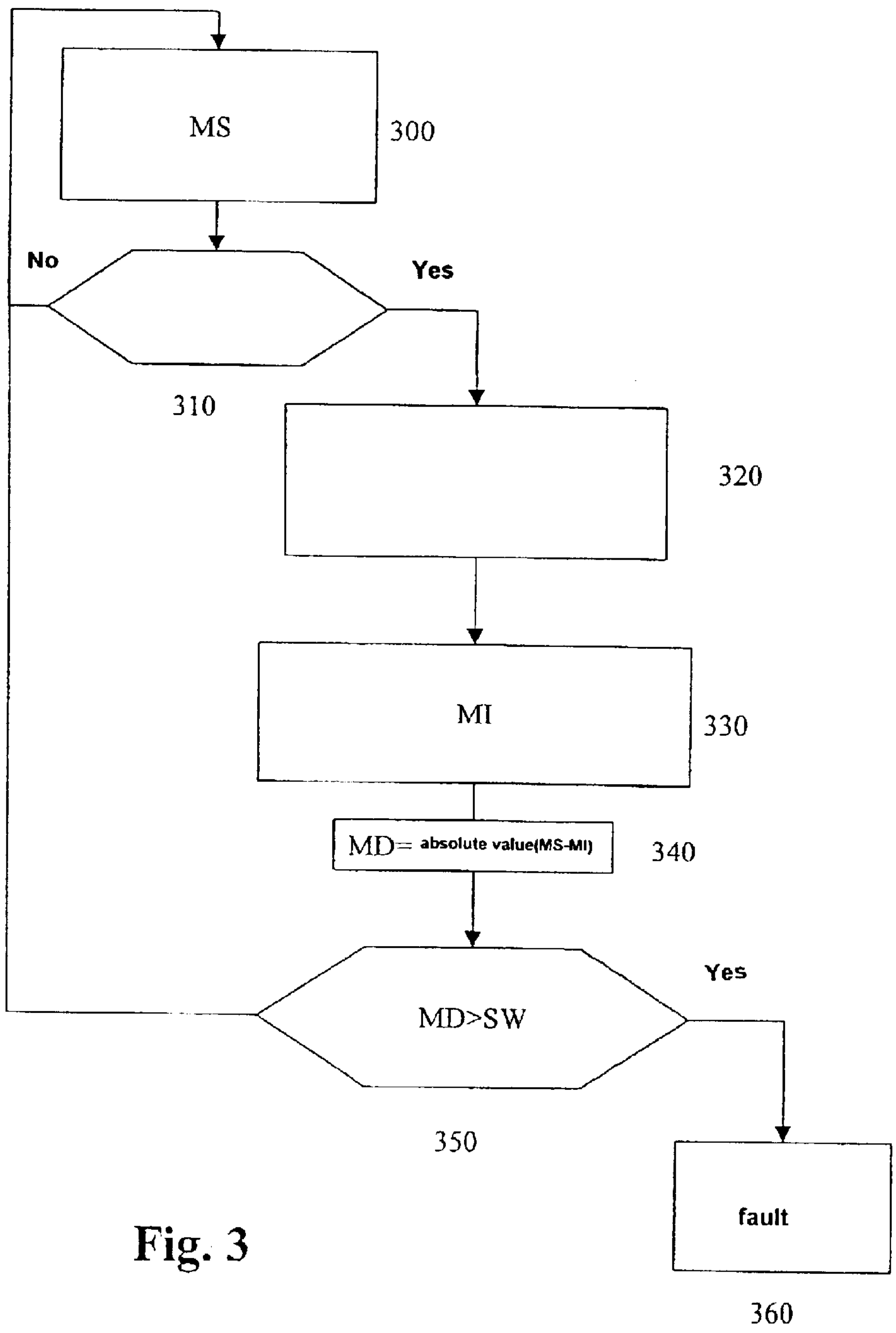
FIG. 3 shows a flow chart to illustrate the method according to the present invention.

FIG. 3 illustrates the method on the basis of a flow chart. In a first step 300 setpoint torque MS is calculated from the rotational speed and accelerator pedal position FP. A subsequent query 310 checks on whether there are operating states in which a plausibility check may be possible. If this is not the case, step 300 is performed again.

If there is such an operating state, then in step 320 the indicated torque is determined for each individual cylinder. To do so, the actuation duration is weighted with the crankshaft angle and the torque thus indicated is determined per injection. This determination may be performed for each partial injection, i.e., for pre-injections, main injections and post-injections. Fuel quantities metered in post-injection may be weighted with a value of zero because they do not make any contribution to torque. Actuation duration, main injection and pre-injection determine the indicated torque of the respective injection according to a preselectable function.

In subsequent step 330, the individual indicated torques are integrated over a plurality of partial injections and/or a plurality of cylinders, and actual torque MI is determined from this. Then in step 340 the absolute value of the difference between setpoint torque MS and actual torque MI is calculated. Subsequent query 350 checks on whether the absolute value of torque difference MD is greater than a threshold value SW. If this is not the case, step 300 is performed again.

If absolute value MD of the torque difference is greater than a threshold value, then a check for faults is performed in step 360. Threshold value SW is selected so that possible tolerances in determination of the torque do not lead to triggering of a fault.

What is claimed is:

1. A method of controlling an engine, comprising the steps of:

determining, on the basis of a first variable which characterizes an injection quantity and a second variable which characterizes an angular position at which the injection quantity is metered, a third variable which characterizes a torque supplied by the engine;

determining, on the basis of a fourth variable which characterizes an intent of a driver, a fifth variable which characterizes a torque desired by the driver; and analyzing the third variable and the fifth variable for the purpose of fault monitoring.

2. The method according to claim 1, wherein:

the first variable corresponds to an actuation duration of an output stage of a solenoid valve.

3. The method according to claim 1, wherein:

the first variable corresponds to an actuation duration of an output stage of a piezoactuator.

4. The method according to claim 3, wherein:

the angular position is that of a crankshaft; and the second variable corresponds to the angular position of the crankshaft at which the injection occurs.

5. The method according to claim 2, wherein:

the angular position is that of a crankshaft; and the second variable corresponds to the angular position of the crankshaft at which the injection occurs.

6. The method according to claim 5 or 4, wherein:

the fourth variable corresponds to a position of an operating element.

7. The method according to claim 2 or 3, wherein:

the fourth variable corresponds to a position of an operating element.

8. The method according to claim 2 or 3, further comprising the step of:

detecting a fault when the third variable and the fifth variable differ by more than a threshold value.

9. The method according to claim 2 or 3 wherein:

the fault monitoring takes place only in certain operating states.

10. The method according to claim 2 or 3, wherein the fourth variable is determined using an accelerator pedal position and a torque characteristic map.

11. The method according to claim 1, wherein:

the fourth variable corresponds to a position of an operating element.

12. The method according to claim 1, further comprising the step of:

detecting a fault when the third variable and the fifth variable differ by more than a threshold value.

13. The method according to claim 1, wherein:

the fault monitoring takes place only in certain operating states.

14. The method according to claim 1, wherein the fourth variable is determined using an accelerator pedal position and a torque characteristic map.

15. The method according to claim 5 or 4, further comprising the step of:

detecting a fault when the third variable and the fifth variable differ by more than a threshold value.

16. The method according to claim 5 or 4, Wherein:

the fault monitoring takes place only in certain operating states.

17. The method according to claim 5 or 4, wherein the fourth variable is determined using an accelerator pedal position and a torque characteristic map.

18. A device for controlling an engine, comprising:

an arrangement for determining, on the basis of a first variable which characterizes an injection quantity and a second variable which characterizes an angular position at which the injection quantity is metered, a third variable which characterizes a torque supplied by the engine;

an arrangement for determining, on the basis of a fourth variable which characterizes an intent of a driver, a fifth variable which characterizes a torque desired by the driver; and an arrangement for analyzing the third variable and the fifth variable for the purpose of fault monitoring.

* * * * *